(12) United States Patent
Laturell et al.

(10) Patent No.: US 9,673,859 B2
(45) Date of Patent: Jun. 6, 2017

(54) RADIO FREQUENCY BITSTREAM GENERATOR AND COMBINER PROVIDING IMAGE REJECTION

(71) Applicant: AVAGO TECHNOLOGIES GENERAL IP (SINGAPORE) PTE. LTD., Singapore (SG)

(72) Inventors: Donald R. Laturell, Oak Hill, FL (US); Said E. Abdelli, Minneapolis, MN (US); Peter Kiss, Basking Ridge, NJ (US); James F. MacDonald, Mendota Heights, MN (US); Ross S. Wilson, Menlo Park, CA (US)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 152 days.

(21) Appl. No.: 14/381,019

(22) PCT Filed: Mar. 14, 2013

(86) PCT No.: PCT/US2013/031306
§ 371 (c)(1),
(2) Date: Aug. 26, 2014

(87) PCT Pub. No.: WO2014/142871
PCT Pub. Date: Sep. 18, 2014

(65) Prior Publication Data
US 2016/0211885 A1    Jul. 21, 2016

(51) Int. Cl.
*H04B 3/02* (2006.01)
*G06G 7/14* (2006.01)
*H04B 15/00* (2006.01)

(52) U.S. Cl.
CPC .............. *H04B 3/02* (2013.01); *G06G 7/14* (2013.01); *H04B 15/00* (2013.01)

(58) Field of Classification Search
CPC ................................. H04B 3/02; H04B 15/00
(Continued)

(56) References Cited

U.S. PATENT DOCUMENTS 5,291,201 A * 3/1994 Endler ..................... G01S 7/38
342/13
7,120,415 B2 10/2006 Minnis et al.
(Continued)

FOREIGN PATENT DOCUMENTS

WO         0010129 A1     2/2000

OTHER PUBLICATIONS

B.C. Henderson, et al., "Tech-Note: Image-Reject and Single-Sideband Mixers," The Communications Edge, vol. 12, No. 3, pp. 1-6, WJ Communications, Inc., May/Jun. 1985.
(Continued)

*Primary Examiner* — Michael Neff
(74) *Attorney, Agent, or Firm* — Sheridan Ross P.C.

(57) ABSTRACT

A circuit for combining analog signals includes first and second bitstream generators and a directional coupled connected therewith. The first bitstream generator receives a first analog signal and generates a first digital bitstream as a function thereof. The second bitstream generator receives a second analog signal and generates a second digital bitstream as a function thereof. The first and second bitstream generators are configured to maintain a ninety-degree phase difference between the first and second digital bitstreams. The directional coupler receives, at a first port, the first digital bitstream, and receives, at a second port, the second digital bitstream. The directional coupler includes a third port that is terminated, and a fourth port which generates a first output signal indicative of a combination of the first and second digital bitstreams in a manner that an image component is suppressed without a need for filtering.

21 Claims, 9 Drawing Sheets

(58) Field of Classification Search
USPC .......................................................... 375/285
See application file for complete search history.

(56) References Cited

U.S. PATENT DOCUMENTS

2002/0138540 A1    9/2002  Enam
2010/0070285 A1    3/2010  Kim et al.

OTHER PUBLICATIONS

Frank R. Kschischang, "The Hilbert Transform," The Edward S. Rogers Sr. Department of Electrical and Computer Engineering, University of Toronto, pp. 1-12, Oct. 2006.
Cobham, "Application Note: RF Directional Couplers and 3dB Hybrids Overview," M/A-COM, M560, v2.00, pp. 1-10, Oct. 2004.
Donald E. Norgard, "The Phase-Shift Method of Single-Sideband Signal Generation," IEEE Proceedings of the IRE, vol. 44, Issue 12, pp. 1718-1735, Dec. 1956.
Sidney Darlington, "Realization of a Constant Phase Difference," Bell System Technical Journal, vol. 29, Issue 1, pp. 94-104, Jan. 1950.
W. Wiebach, "Design and Analysis of 90-Degree Phase Difference Networks," AD-769 585, Harry Diamond Laboratories, Washington, D.C., pp. 1-52, National Technical Information Service, U.S. Dept. of Commerce, May 1973.

\* cited by examiner

|   | A | B | C | D |
|---|---|---|---|---|
| A |   | ISOLATION | 0 | -90 |
| B | ISOLATION |   | -90 | 0 |
| C | 0 | -90 |   | ISOLATION |
| D | -90 | 0 | ISOLATION |   | ize
RADIO FREQUENCY BITSTREAM GENERATOR AND COMBINER PROVIDING IMAGE REJECTION

CROSS-REFERENCE TO RELATED APPLICATION(S)

The present application is a national stage entry, under 35 U.S.C. §371, of PCT International Patent Application No. PCT/US2013/031306 filed on Mar. 14, 2013, the complete disclosure of which is expressly incorporated herein by reference in its entirety for all purposes.

BACKGROUND

Noise shaping is a well-known technique typically used in digital signal processing applications, often in conjunction with dithering, as part of the quantization of a digital signal for increasing a signal-to-noise ratio (SNR) of the resultant signal. Noise shaping achieves this by changing a spectral shape of the error introduced by the quantization process, such that the noise power in the frequency range of interest is reduced to a lower level and this noise power is correspondingly pushed to a higher level outside of the frequency range of interest where such noise is less perceptible.

Digital radio frequency (RF) systems using shaped quantization noise can achieve higher efficiency when switched at lower sampling rates. If sample rates are too low, however, an image of the desired carrier signal may appear in or near the desired signal band. When this occurs, expensive lossy reflective or absorptive filters are required to remove the undesired image component.

SUMMARY

Embodiments of the present invention provide techniques for efficiently combining two or more RF signals in such a manner that image components associated with the RF signals are suppressed without a need for filtering.

In accordance with an embodiment of the invention, a circuit for combining a plurality of analog signals includes first and second bitstream generators and a directional coupled connected with the first and second bitstream generators. The first bitstream generator is operative to receive a first analog signal and to generate a first digital bitstream as a function of the first analog signal. The second bitstream generator is operative to receive a second analog signal and to generate a second digital bitstream as a function of the second analog signal. The first and second bitstream generators are configured to maintain a substantially ninety-degree phase difference between the first and second digital bitstreams. The directional coupler receives, at a first port, a first input signal comprising the first digital bitstream, and receives, at a second port, a second input signal comprising the second digital bitstream. The directional coupler including a third port that is terminated and generating, at a fourth port, a first output signal which is indicative of a combination of the first and second input signals in such a manner that an image component associated with at least one of the first and second input signals is suppressed in amplitude at the fourth port without a need for filtering to attenuate the image component.

In accordance with another embodiment, an electronic system includes at least one integrated circuit, the integrated circuit including at least one circuit for combining a plurality of digital bitstreams. The circuit includes first and second bitstream generators and a directional coupled connected with the first and second bitstream generators. The first bitstream generator is operative to receive a first analog signal and to generate a first digital bitstream as a function of the first analog signal. The second bitstream generator is operative to receive a second analog signal and to generate a second digital bitstream as a function of the second analog signal. The first and second bitstream generators are configured to maintain a substantially ninety-degree phase difference between the first and second digital bitstreams. The directional coupler receives, at a first port, a first input signal comprising the first digital bitstream, and receives, at a second port, a second input signal comprising the second digital bitstream. The directional coupler including a third port that is terminated and generating, at a fourth port, a first output signal which is indicative of a combination of the first and second input signals in such a manner that an image component associated with at least one of the first and second input signals is suppressed in amplitude at the fourth port without a need for filtering to attenuate the image component.

Embodiments of the invention will become apparent from the following detailed description thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Embodiments of the invention will be described herein in the context of illustrative radio frequency (RF) bitstream generator and combiner circuits which utilize filters in a digital domain and a quadrature coupler(s) in an analog domain to selectively combine or reject image signals from two or more bitstreams. It should be understood, however, that embodiments of the invention are not limited to these or any other particular bitstream generator and combiner circuits. Rather, embodiments of the invention are more broadly related to techniques for efficiently combining multiple bitstreams while providing beneficial image rejection without a need for costly filtering to suppress image components introduced in an output signal. Moreover, it will become apparent to those skilled in the art given the teachings herein that numerous modifications can be made to the illustrative embodiments shown that are within the scope of the claimed invention. That is, no limitations with respect to the embodiments shown and described herein are intended or should be inferred.

As a preliminary matter, for purposes of clarifying and describing embodiments of the invention, the following table provides a summary of certain acronyms and their corresponding definitions, as the terms are used herein:

Table of Acronym Definitions

| Acronym | Definition |
| --- | --- |
| SNR | Signal-to-noise ratio |
| RF | Radio frequency |
| IRM | Image rejection mixer |
| IF | Intermediate frequency |
| BSG | Bitstream generator |

As previously stated, digital RF systems using shaped quantization noise can achieve higher efficiency by switching at lower sampling rates. If sample rates are too low, however, an image of the desired carrier signal may appear in or near the desired signal band, requiring the use of expensive lossy reflective or absorptive filters to remove the undesired image component. As will be described in further detail below, embodiments of the invention eliminate the need for filtering to remove the image component.

Figure 1:
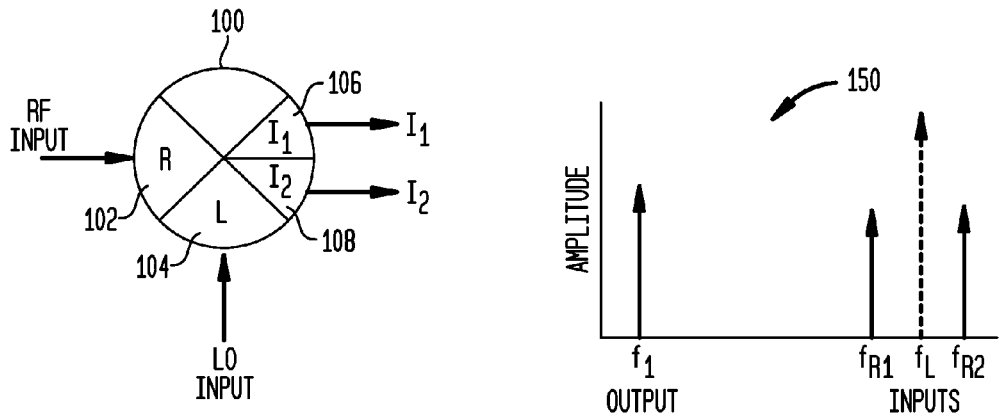
FIG. 1 is a conceptual illustration depicting an exemplary image rejection mixer and its corresponding frequency spectral plot.

FIG. 1 is a conceptual illustration depicting an exemplary image rejection mixer (IRM) 100 and its corresponding frequency spectral plot 150. The IRM 100 includes a first port 102 adapted to receive an RF input signal, a second port 104 adapted to receive a local oscillator (LO) signal having a frequency $f_L$, a third port ($I_1$) 106 adapted to generate a first intermediate frequency (IF) output signal, and a fourth port ($I_2$) 108 adapted to generate a second IF output signal. In this illustration, if signal $f_{R2}$ shown in the spectral plot 150 is assumed to be the desired input signal, then signal $f_{R2}$ is its corresponding image. The image is an undesired input signal to the IRM 100. The frequency of the image is above or below the LO frequency by an amount equal to the IF frequency. The desired and image input signals $f_{R1}$ and $f_{R2}$, respectively, are mixed with the LO signal and the two products are channelized into separate output ports 106 and 108. Only one of the output signals, $f_1$, is shown in the spectral plot 150.

Figure 2:
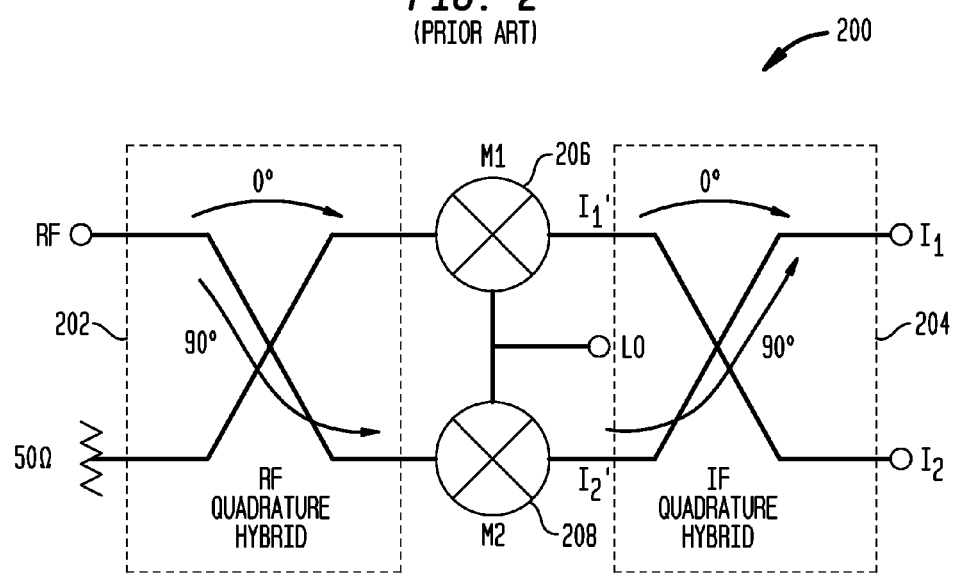
FIG. 2 is a block diagram depicting an illustrative mixer circuit which may be used to implement the exemplary image rejection mixer shown in FIG. 1.

FIG. 2 is a block diagram depicting an illustrative mixer circuit 200 which may be used to implement the exemplary IRM 100 shown in FIG. 1. Mixer circuit 200 includes first and second quadrature hybrid couplers, 202 and 204, respectively, coupled together via first and second mixers, 206 and 208, respectively. Directional couplers and hybrids are passive devices in which two transmission lines pass close enough to one another for energy propagating on one transmission line to couple to the other transmission line. RF directional couplers in particular can be implemented using a variety of techniques, such as, but not limited to, stripline, coaxial feeder, and lumped or discrete elements.

More particularly, with reference to FIG. 2, the first quadrature hybrid coupler 202 has a first port adapted to receive an RF input signal, a second port, which is terminated (e.g., using a 50-ohm resistor) in this embodiment, a third port adapted to generate a first (zero-degree) RF output signal which is fed to an input of the first mixer (M1) 206, and a fourth port adapted to generate a second (90-degree) RF output signal which is fed to an input of the second mixer (M2) 208. An LO signal is fed to second inputs of the first and second mixers 206, 208.

The first mixer 206 is operative to generate a first downconverted current signal, $I_1'$, which is fed to a first port of the second quadrature hybrid coupler 204. The second mixer 208 is operative to generate a second downconverted current signal, $I_2'$, which is fed to a second port of the second quadrature hybrid coupler 204. The phase angles of signals $I_1'$ and $I_2'$ are 0 degrees and 90 degrees, respectively. The signal at frequency $f_{R1}$ will downconvert to exit at a third port, $I_1$, of the quadrature hybrid coupler 204, and the signal at frequency $f_{R2}$ will downconvert to exit at a fourth port, $I_2$, of the hybrid coupler. If $f_{R1}$ is the desired signal, then $f_{R2}$ is its image.

As in any mixer, the phase angles of the RF and LO input signals are conserved throughout the mixing process. The phase of the IF output will be a sum of the IF and LO input phase angles, multiplied by their respective harmonic coefficients, m and n, where m and n are positive or negative integers. These coefficients define the inter-modulation (IM) products generated by the mixer, such that $f_{IM}=mf_R+nf_L$. For the desired and image downconverted products, m and n equal ±1. For instance, with reference again to FIG. 1, if the frequency of the downconverted desired signal is $f_R=f_L-f_{R1}$, then m=−1 and n=1, and its phase angle is equal to $\theta_L-\theta_{R1}$, where $\theta_L$ and $\theta_{R1}$ are the phase angles of the LO and RF input signals, respectively. Likewise, the frequency of the downconverted image signal is $f_{IM}=f_{R2}-f_L$, with m=1 and n=−1, and its phase angle is equal to $\theta_{R2}-\theta_L$. The technique used in FIGS. 1 and 2 may be employed to suppress a sideband, for example.

Embodiments of the invention advantageously eliminate the need for costly filtering to remove the image component by combining multiple digital bitstreams in a manner which provides beneficial attenuation of the image component (i.e., image rejection). To accomplish this, embodiments of the invention advantageously utilize filters, such as, for example, a Hilbert bandpass filter, in a digital domain, and exploit phase cancellation properties of an RF directional coupler (e.g., a quadrature hybrid coupler) in the analog domain to selectively combine or reject image components from the multiple bitstreams.

Figure 3:
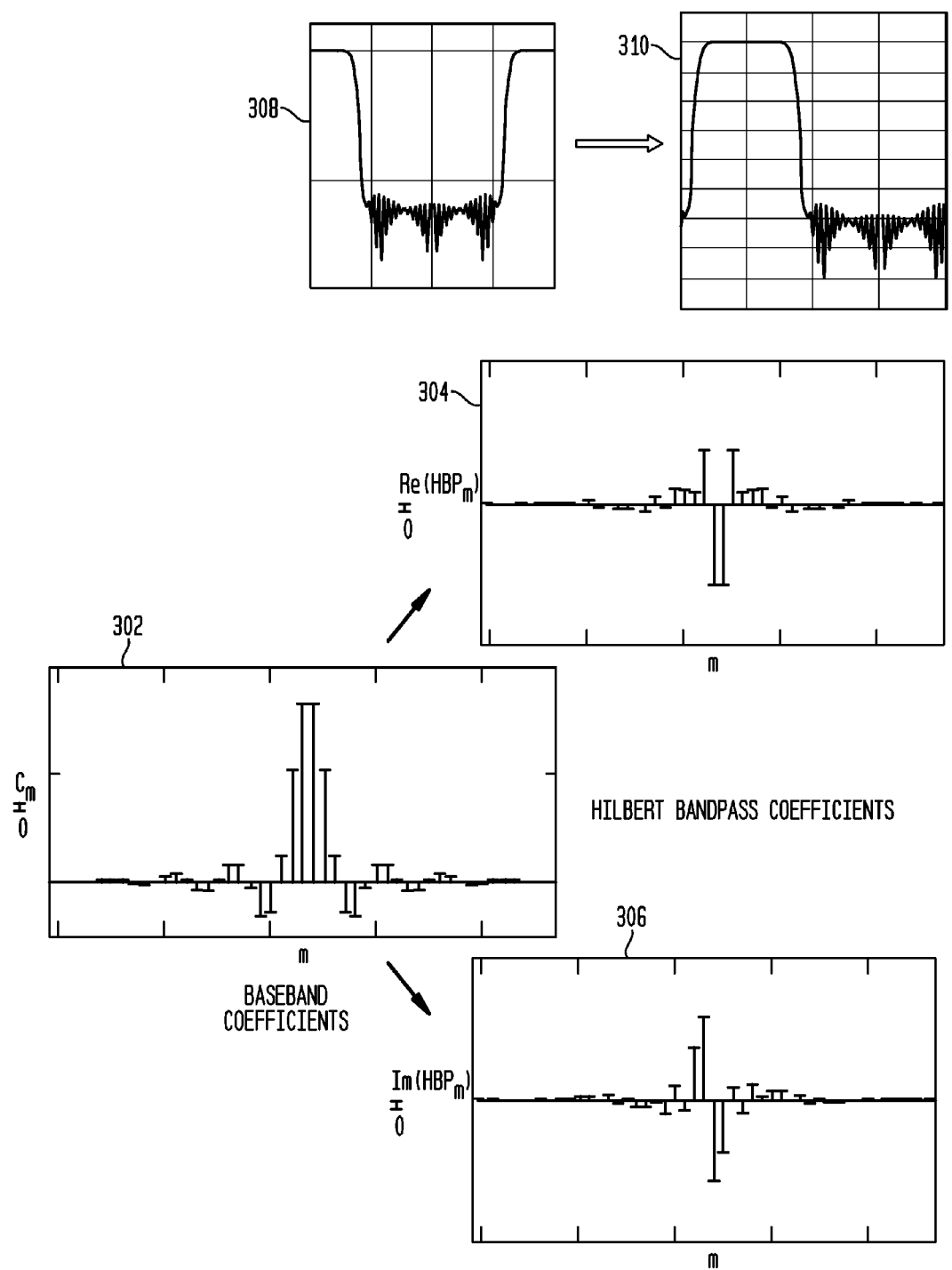
FIGS. 3 and 4 conceptually depict an exemplary technique for achieving image rejection using a discrete Hilbert bandpass filter in a digital domain and using quadrature hybrid coupling in an analog domain, according to an embodiment of the invention.
Figure 4:
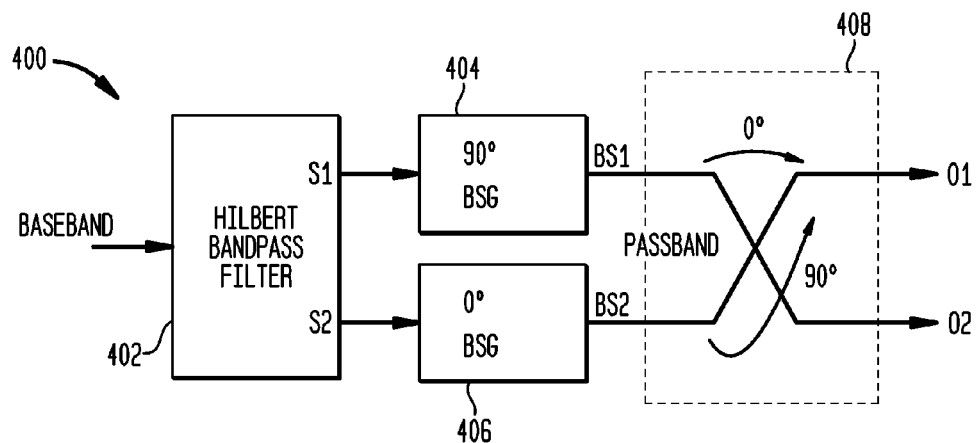

FIGS. 3 and 4 conceptually depict an exemplary technique for achieving image rejection using a discrete Hilbert bandpass filter in a digital domain and using quadrature hybrid coupling in an analog domain, according to an embodiment of the invention. With reference to FIG. 3, baseband and Hilbert bandpass coefficients are graphically shown. Specifically, graph 304 illustrates baseband coefficients associated with an input signal to the Hilbert filter. Multiplying the baseband coefficients by a complex carrier definition yields a set of real (Re) and Imaginary (Im) Hilbert baseband coefficients:

$$HBP_m := c_m e^{i \cdot 2\pi \cdot (1-1800\tau) \cdot \left[\left(\frac{N-1}{2}\right) - m\right]}, \quad (1)$$

where $c_m$ represents a coefficient of index m, where m is an integer, $\tau$ is indicative of sample rate (i.e., $1/F_S$, where $F_S$ is the sampling frequency), 1800 is, to some degree, dimensionless, as $\tau$ is not explicitly defined (e.g., 1800 could be 1800 MHz), and N is an index into a vector.

Graph 304 illustrates real Hilbert baseband coefficients (Re($HBP_m$)) and graph 306 illustrates imaginary Hilbert baseband coefficients (Im($HBP_m$)) corresponding to the baseband coefficients in graph 302. Graphs 308 and 310 conceptually illustrate a mathematical progression from real-valued low-pass filtering to complex-valued Hilbert bandpass filtering, respectively. It is to be appreciated that while FIG. 3 depicts one methodology for generating a Hilbert bandpass filter, any suitable method of generating a Hilbert filter, as will be known by those skilled in the art, will produce the same or similar results.

With reference now to FIG. 4, a block diagram is shown depicting an exemplary RF bitstream generator and combiner 400 which incorporates image rejection, according to an embodiment of the invention. The bitstream generator and combiner 400 includes a Hilbert bandpass filter 402 adapted to receive an analog RF baseband input signal and operative to generate a pair of output signals, S1 and S2. The real-valued baseband input signal is split into a complex-valued output signal with a quadrature relationship (90-degree relationship) maintained between the real and the imaginary portion of the signal pairs S1 and S2.

Signals S1 and S2 generated by the Hilbert bandpass filter 402 are fed to corresponding inputs of a first bitstream generator (BSG) 404 and a second bitstream generator 406, respectively. The signal S1 is phase-shifted relative to the signal S2 by ninety degrees, in accordance with the quadrature relationship. Between any two ports that are applied to the quadrature coupler, there is a quadrature relationship that is maintained between the two applied signals. In other embodiments, more than two source signals can be concatenated to use multiple quadrature couplers, as will be shown in further detail below in conjunction with FIG. 9. Each of the bitstream generators 404, 406 is operative to implement an algorithmic procedure for producing an unending sequence (i.e., stream) of binary digits as a function of a received analog input signal. Thus, bitstream generator 404 is operative to generate a first digital bitstream signal, BS1, and bitstream generator 406 is operative to generate a second digital bitstream signal, BS2, which is phase-shifted by ninety degrees relative to the first bitstream signal BS1.

In ordinary use, incoming frames are often continuously converted to modulated RF carriers. In this illustrative embodiment, there is no modulation; a single sinusoid is used to illustrate the image rejection technique. However, it is to be appreciated that techniques according to embodiments of the invention work equally well with modulated carriers.

The bitstream generator and combiner 400 further includes a quadrature combiner 408, or an alternative hybrid coupler which retains the property of minimum loss with a quadrature phase relationship between input ports. The quadrature combiner 408 is adapted to receive the pair of bitstream signals BS1 and BS2 generated by the bitstream generators 404 and 406, respectively, and to generate corresponding output signals, O1 and O2. A quadrature combiner is essentially a four-port network device, details of which will be described in connection with FIGS. 5A and 5B.

Figure 5A:
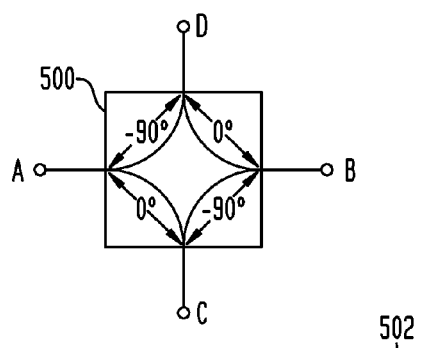
FIGS. 5A and 5B are circuit diagrams depicting exemplary RF 90-degree hybrid couplers and corresponding phase truth tables which are used to explain an operation of the hybrid coupler.
Figure 5B:
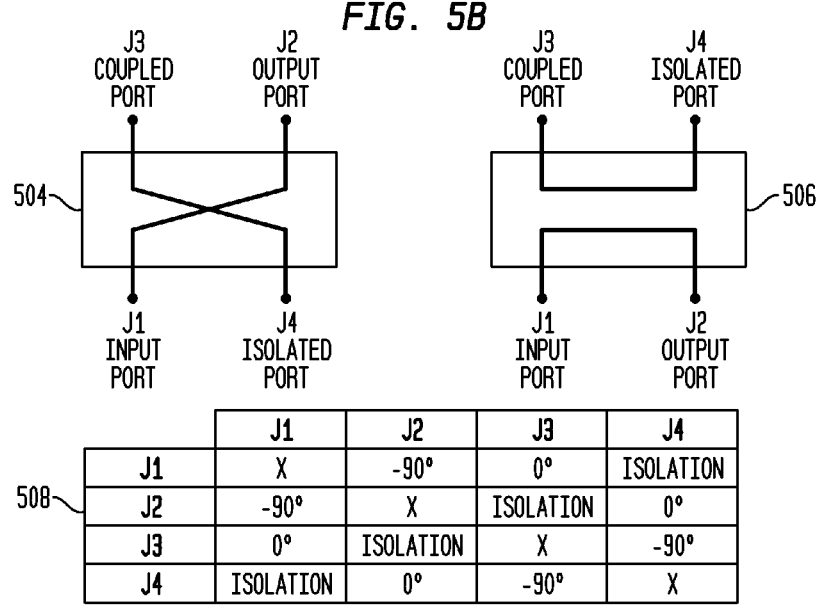

FIGS. 5A and 5B are circuit diagrams depicting exemplary RF 90-degree hybrid couplers and corresponding phase truth tables which are used to explain an operation of the hybrid coupler. With reference to FIG. 5A, an illustrative hybrid coupler 500 includes four ports, A, B, C and D. The hybrid coupler 500 is, in this embodiment, a 90-degree hybrid, also referred to as a quadrature hybrid. A quadrature hybrid is electrically and mechanically symmetrical about both the x and y axes. Thus, when any one of the ports is fed by a signal source, two equal-power (measured in terms of amplitude) output signals that are 90 degrees out of phase with each other will result. Non-adjacent ports A and B of hybrid coupler 500 are electrically isolated; similarly, non-adjacent ports C and D are isolated. The phase relationships between ports A, B, C and D of the hybrid coupler 500 are shown in phase truth table 502.

FIG. 5B depict schematic diagrams of two configurations of the quadrature hybrid 500 depicted in FIG. 5A, along with a corresponding phase truth table. Specifically, a cross-over hybrid configuration 504 and a non-crossover hybrid configuration 506 are shown. In each embodiment, four port functions are assigned, with J1 being designated as an input port, J2 being designated as an output port, J3 being designated as a coupled port, and J4 being designated as an isolated port. These ports may be arbitrarily assigned, but defining two of the ports essentially fixes the designations of the other two ports, since the phase relationship of signals between the inputs is quadrature. A phase truth table 508, like the phase truth table 502 shown in FIG. 5A, indicates the phase relationships between all ports for the two hybrid configurations 504, 506.

Figure 6:
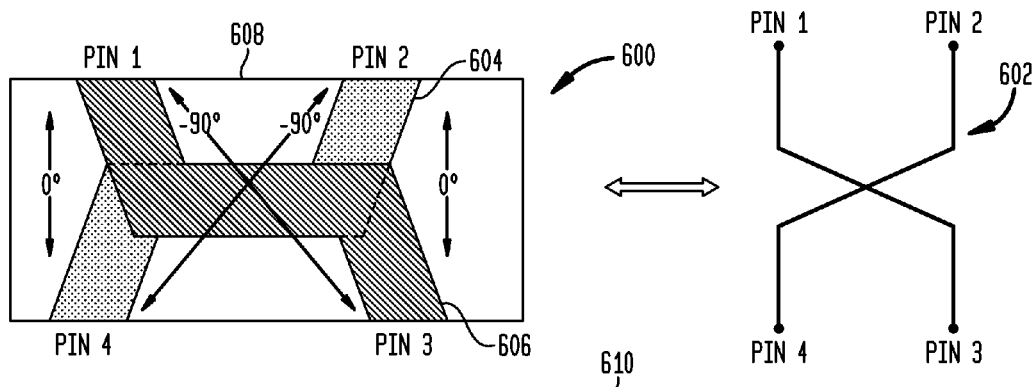
FIG. 6 depicts an exemplary stripline quadrature crossover hybrid coupler and corresponding schematic representation, along with a table providing phase relationship information between ports of the coupler when used in both splitter and combiner configurations.

FIG. 6 depicts an exemplary stripline quadrature crossover hybrid coupler 600 and corresponding schematic representation 602, along with a table providing phase relationship information between ports of the coupler when used in both splitter and combiner configurations. With reference to FIG. 6, the stripline coupler 600 includes a first conductive segment (i.e., trace) 604, which may be formed of metal (e.g., copper) or another electrically conductive material (e.g., polysilicon, etc.), and a second conductive segment 606, which may be formed of the same or a different electrically conductive material as the first conductive segment. The first and second conductive segments 604, 606 are preferably fabricated on a dielectric substrate 608. Although not explicitly shown, the first and second conductive segments 604, 606 are electrically isolated from one another using a dielectric layer formed between the first and second conductive segments.

Materials used to form the substrate 608 and/or dielectric layer include, but are not limited to, low loss PTFE (polytetrafluoroethylene, e.g., Teflon), impregnated fiberglass laminates (both woven and non-woven), glass-filled, cross-linked polystyrenes, pure PTFE, and ceramic composites. These dielectrics are generally used to separate two identical circuits coupled to each other through precise registration, with the amount of coupling being controlled as a function of one or more of the type of material used to form the conductive segments 604, 606, the dielectric layer, and/or the substrate 608, and a thickness of the dielectric layer separating the first and second conductive segments. It is to be understood that each material has specific properties associated therewith that may offer certain advantages; however, none of the material properties precludes the development of a quadrature coupling mechanism.

As described in connection with FIGS. 5A and 5B, the quadrature cross-over hybrid coupler 600 includes four ports, labeled PIN 1, PIN 2, PIN 3 and PIN 4. A phase relationship between each of the ports, when the coupler 600 is used in a splitter configuration and a combiner configuration, is provided in table 610. With reference to table 610, in a splitter configuration, when PIN 1 is designated as an input port, PIN 2 will be isolated, PIN 3 will generate a first output signal that is phase-shifted from an input signal supplied to PIN 1 by 90 degrees, and PIN 4 will generate a second output signal that is in-phase (i.e., zero-degree phase shifted) with the input signal. The first and second output signals generated by the coupler 600 will be slightly attenuated (by about 3 dB) relative to the input signal due to losses in the coupler resulting from the signal splitting function. When the input signal is supplied to the other ports (e.g., PIN 2, PIN 3, or PIN 4), the respective functions of the remaining ports will change accordingly, as shown in the table 610.

When the coupler 600 is used in a combiner configuration, a first input signal is supplied to PIN 1 and a second input signal is supplied to PIN 2, in one scenario. The first and second input signals, in this scenario, each have an amplitude, A, and the first input signal is phase-shifted from the second input signal by 90 degrees. PIN 3, in this scenario, is an isolated port, and a combined output signal is generated at PIN 4. The output signal will have a loss of about 0.1 dB to about 0.5 dB compared with the respective powers of the combined input signals. Although other combining methods may be used with embodiments of the invention, quadrature combiners are generally known in the industry to be among the most efficient types of combiners. When the input signals are supplied to the other ports, the respective functions of the remaining ports will change accordingly, as shown in table 610. When two quadrature signals with equal power (e.g., in terms of amplitude) are applied to the coupler 600 as described in table 610, they will combine at the output port. Alternatively, if the powers of the two quadrature signals are not equal, some of the applied energy will be directed to the isolated port.

Figure 7:
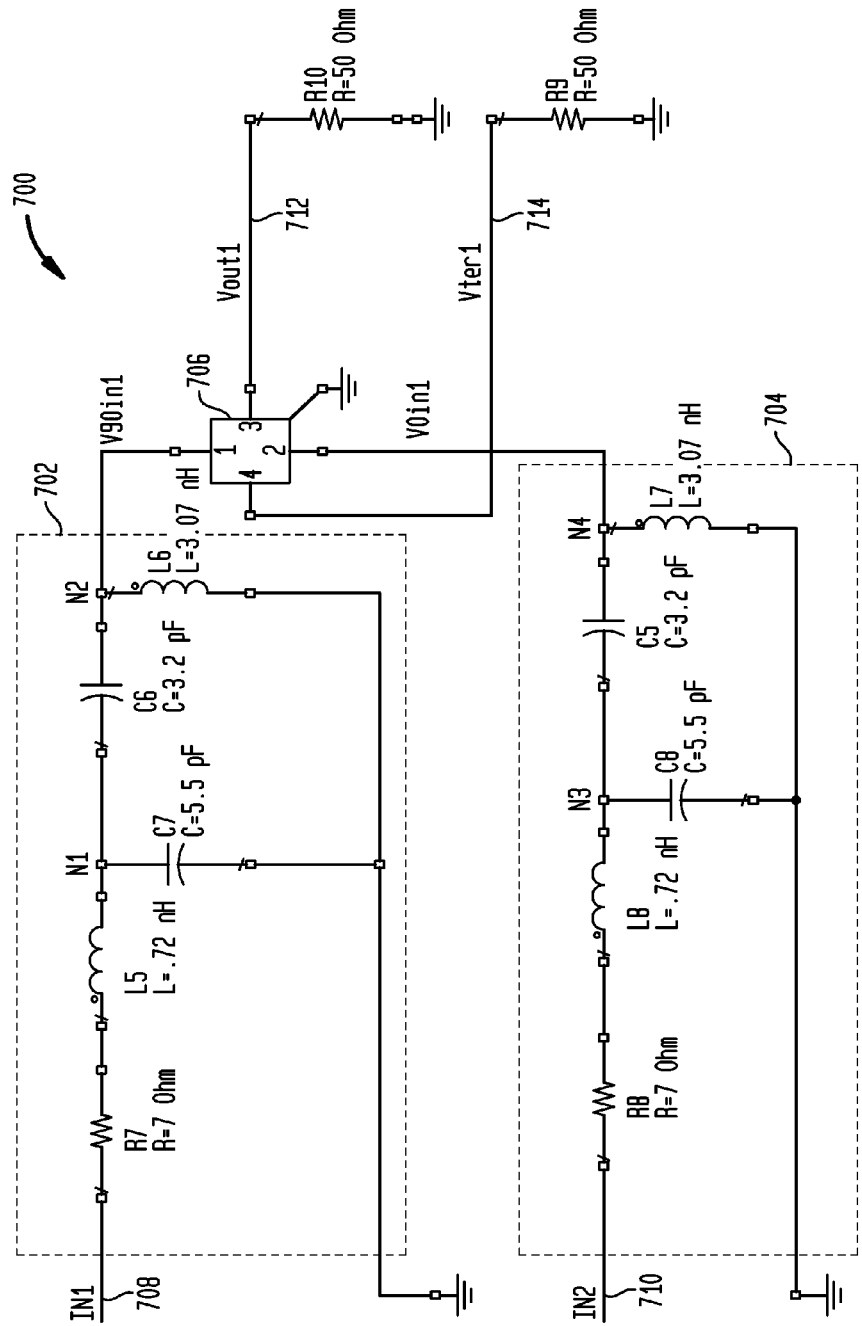
FIG. 7 is a schematic diagram depicting at least a portion of an exemplary RF combiner circuit, according to an embodiment of the invention.

FIG. 7 is a schematic diagram depicting at least a portion of an exemplary RF bitstream combiner circuit 700, according to an embodiment of the invention. The combiner circuit 700 includes two low-Q impedance transformation networks, 702 and 704, and an RF directional coupler 706 (e.g., quadrature hybrid coupler, 3-dB hybrid, etc.). With regard to the impedance transformation networks 702, 704, while it may be preferable to use low-Q networks, embodiments of the invention are not limited to low-Q networks. Rather, the Q of the network is essentially immaterial; however, the bandwidth of the circuit should match over a desired frequency range. Directional couplers suitable for use with embodiments of the invention include, but are not limited to, quadrature hybrid couplers manufactured by M/A-Com, Inc., Narda Microwave-East (a subsidiary of L-3 Communications Holdings, Inc.), etc.

The impedance transformation networks 702 and 704, in this embodiment, are Norton equivalent representations of transmission lines matching the source signals with the characteristic impedance of the RF directional coupler 706. Although the impedance transformation networks 702 and 704 are implemented in this embodiment as broadband Norton equivalent networks, it is to be understood that other network types may also be employed. For example, in accordance with another embodiment, the impedance transformation networks 702 and 704 may be implemented using narrowband Norton equivalent circuits to thereby achieve additional image rejection. It is to be further appreciated that the bandwidth (e.g., broadband vs. narrowband) of the impedance transformation networks 702, 704 is of lesser importance compared to other characteristics of the combiner circuit 700, such as maintaining a quadrature relationship (i.e., 90 degrees) between input signals supplied to the directional coupler 706 over a prescribed bandwidth. The impedance transformation networks 702 and 704 may have an arbitrary input-versus-output phase relationship, as long as they track one another.

In accordance with a quadrature relationship, ideally a ninety-degree phase difference is maintained between the input signals to the directional coupler 706, as previously stated. However, according to embodiments of the invention, it is sufficient that the phase difference between the input signals to the directional coupler 706 be maintained at least within a prescribed range of ninety degrees, such as, for example, 90+/−5 degrees.

The combiner circuit 700, in this embodiment, is considered to be a core functional circuit which, in accordance with other embodiments of the invention, can be expanded for combining more than two input signals. An example of one such expansion of the core functional circuit 700 will be described herein below in conjunction with FIG. 9, in accordance with another illustrative embodiment.

With reference to FIG. 7, a first Norton equivalent low-Q impedance transformation network 702 is adapted to receive, at a first port 708 of the combiner circuit 700, a first input signal, IN1, which may be a zero-degree bitstream signal. While it is assumed in this embodiment that the input signals (e.g., IN1) presented to the combiner circuit 700 are from bitstream generators, it should be appreciated that the combiner circuit will exhibit similar behavior if, for example, continuous time signals are applied in quadrature. Signal IN1 is supplied to a first terminal of a first resistor, R7, having a first resistance (e.g., about 7 ohms, although the actual impedance is immaterial) associated therewith. A second terminal of resistor R7 is connected with a first terminal of a first inductor, L5, having a first inductance (e.g., about 0.72 nanohenries (nH)) associated therewith. A second terminal of inductor L5 is connected with a first terminal of a first capacitor, C6, having a first capacitance (e.g., about 3.2 picofarads (pF)) associated therewith, at node N1. A second terminal of capacitor C6 is connected with a first terminal of a second inductor, L6, having a second inductance (e.g., about 3.07 nH) associated therewith, at node N2. A first terminal of a second capacitor, C7, having a second capacitance (e.g., about 5.5 pF) associated therewith, is connected with inductor L5 and capacitor C6 at node N1. Second terminals of capacitor C7 and inductor L6 are connected with a first voltage source, which is ground in this embodiment. It is to be understood that, with regard to impedance transformation network 702, while exemplary values for the resistors, inductors and capacitors are shown, embodiments of the invention are not limited to any specific values for the circuit components; the exemplary design does not preclude the use of alternative component values for other bandwidths or other transformations.

Likewise, a second Norton equivalent low-Q impedance transformation network 704 is adapted to receive, at a second port 710 of the combiner circuit 700, a second input signal, IN2, which may be a ninety-degree bitstream signal. Signal IN2, which is ninety degrees out of phase relative to the input signal IN1, is supplied to a first terminal of a second resistor, R8, having a second resistance (e.g., about 7 ohms, although the actual impedance is immaterial) associated therewith. A second terminal of resistor R8 is connected with a first terminal of a third inductor, L8, having a third inductance (e.g., about 0.72 nH) associated therewith. A second terminal of inductor L8 is connected with a first terminal of a third capacitor, C5, having a third capacitance (e.g., about 3.2 pF) associated therewith, at node N3. A second terminal of capacitor C5 is connected with a first terminal of a fourth inductor, L7, having a fourth inductance (e.g., about 3.07 nH) associated therewith, at node N4. A first terminal of a fourth capacitor, C8, having a fourth capacitance (e.g., about 5.5 pF) associated therewith, is connected with inductor L8 and capacitor C5 at node N3. Second terminals of capacitor C8 and inductor L7 are connected with the first voltage source. As previously stated, with regard to impedance transformation network 704, while exemplary values for the resistors, inductors and capacitors are shown, embodiments of the invention are not limited to any specific values for the circuit components; the exemplary design does not preclude the use of alternative component values for other bandwidths or other transformations.

A first output signal, V90*in*1, is generated by the first impedance transformation network 702 at node N2, and a second output signal, V0*in*1, is generated by the second impedance transformation network 704 at node N4. As previously stated, a quadrature relationship is maintained between the signals on the input ports of the RF directional coupler 706. Output signal V90*in*1 is supplied to a first port of the RF directional coupler 706, which in this embodiment is a ninety-degree input port. Output signal V0*in*1 is supplied to a second port of the RF directional coupler 706, which in this embodiment is a zero-degree input port. A third port of the RF directional coupler 706, which in this embodiment is an output port, is coupled with a first load impedance element, R10, and forms a third port 712 of the combiner circuit 700. The first load impedance element R10, which has a first resistance (e.g., about 50 ohms) associated therewith, is connected between the output port 712 and ground. A fourth port of the RF directional coupler 706, which in this embodiment is a reflection port, is terminated with a second load impedance element, R9, and forms a fourth port 714 of the combiner circuit 700. The second load impedance element R9, which has a second resistance (e.g., about 50 ohms) associated therewith, is connected between the reflection port 714 and ground. It is to be appreciated that the first and second load impedance elements R10 and R9 are not limited to resistors, but may comprise essentially any load circuitry. Furthermore, the loads coupled with the output and reflection ports 712 and 714 of the combiner circuit 700, respectively, are not limited to 50 ohms.

The first and second impedance transformation networks 702 and 704, respectively, can be readily implemented using, for example, inexpensive (e.g., less than about $0.05 per unit) surface mount components. As previously stated, embodiments of the invention are not limited to the specific circuitry used to form the impedance transformation networks 702 and 704. Rather, the impedance transformation networks 702 and 704 merely illustrate one practical means of combining RF devices with a prescribed power efficiency and image rejection. Other means of presenting the RF input signals to the directional coupler 706 are similarly contemplated, as will become apparent to those skilled in the art given the teachings herein.

It is to be understood that, in accordance with embodiments of the invention, impedance transformation networks 702 and 704 are optional (i.e., impedance transformation networks are not necessarily required for operation). For example, assuming an input impedance of the directional coupler 706 to be about 50 ohms, if each of the bitstream signal sources (e.g., bitstream generators) supplying the respective input signals IN1 and IN2 has an output impedance that is substantially matched to the input impedance of the directional coupler (e.g., about 50 ohms), then no impedance transformation is required.

As is well known, power can be determined according to the expression:

$$P = V^2/R,$$

where P represents power, V represents voltage, and R represents impedance. Thus, the output power for a communications system employing one-volt logic (i.e., V=1 volt), the output power produced by a bitstream generator having a 50-ohm output impedance will be $\frac{1}{50}$ watts. If, however, the output impedance of the bitstream generator is reduced to 7 ohms, the output power produced by the bitstream generator is beneficially increased to $\frac{1}{7}$ watts; a significant increase. An impedance transformation network allows the bitstream generators to operate at a much lower output voltage. The lower output impedance (e.g., 7 ohms), thereby enables increasing the output power with the use of suitable transforming networks, and still substantially match the input impedance of the directional coupler 706, thereby increasing power transfer. Hence, while not required, the impedance transformation networks 702, 704 can provide beneficial performance improvement, according to embodiments of the invention.

Figure 8A:
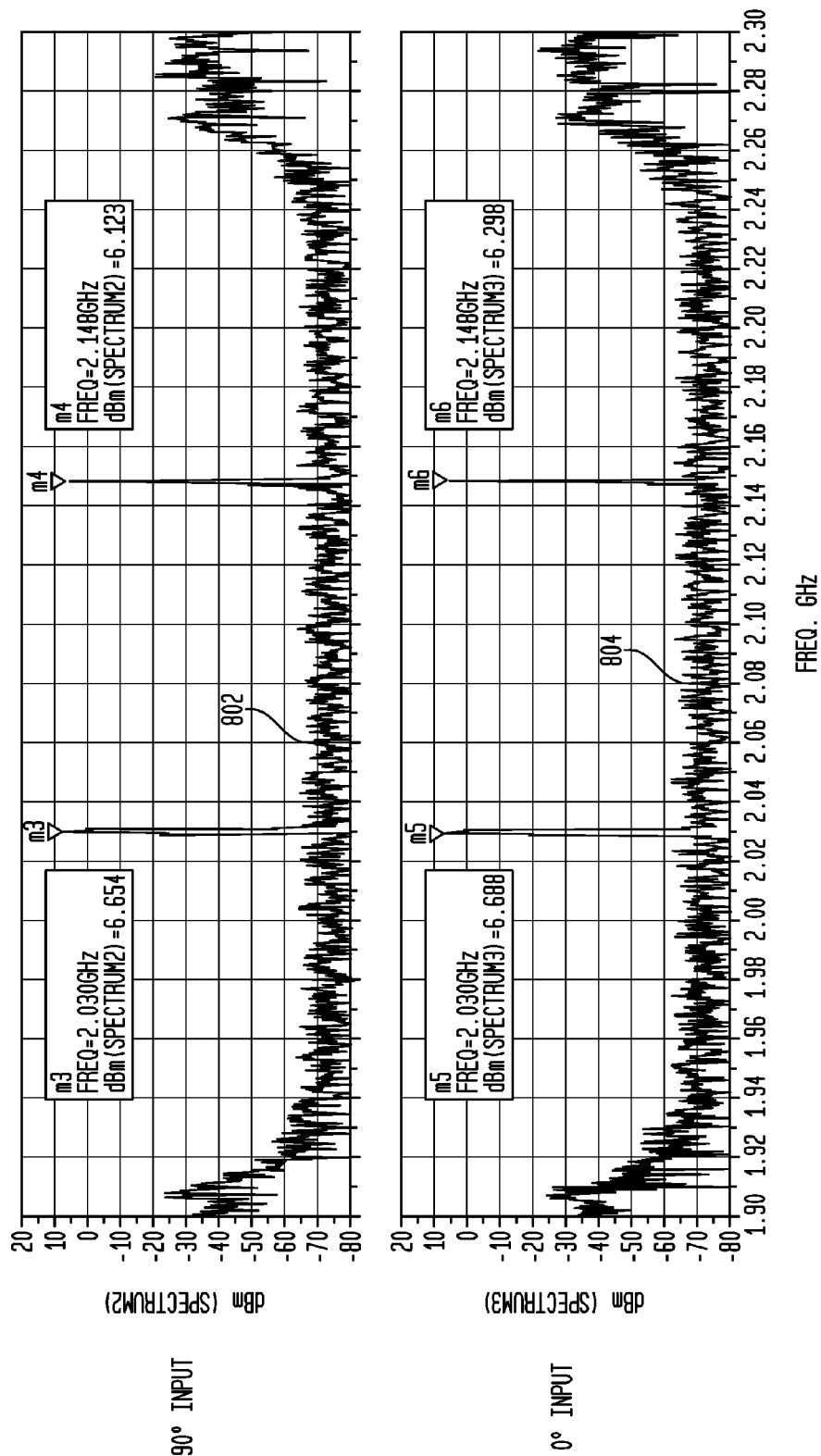
FIGS. 8A and 8B conceptually depict selective cancellation of image components based on selected input digital bitstreams using the illustrative combiner circuit shown in FIG. 7, according to an embodiment of the invention.
Figure 8B:
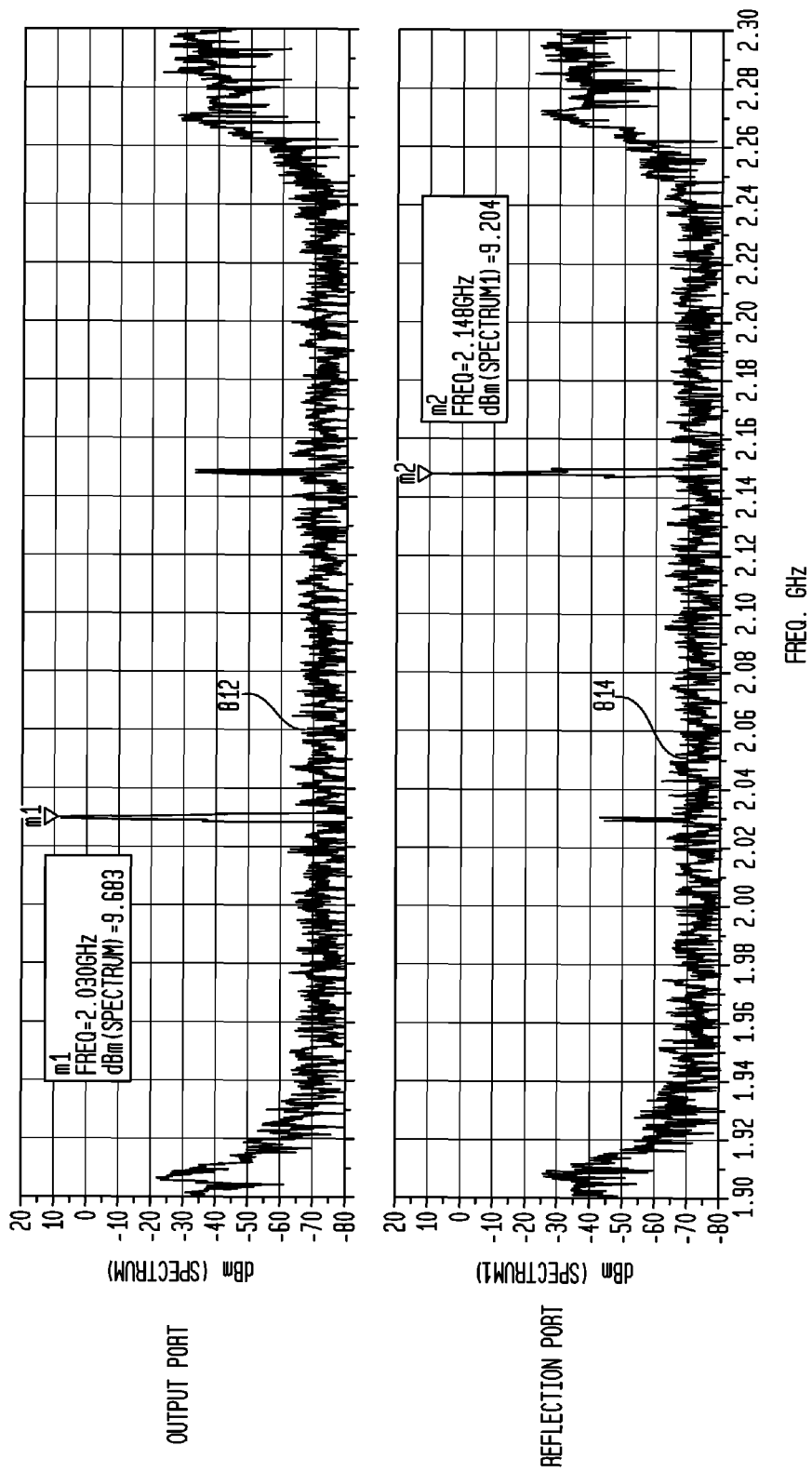

By way of example only and without loss of generality, FIGS. 8A and 8B conceptually depict selective cancellation of image components based on selected input digital bitstreams using the illustrative combiner circuit 700 shown in FIG. 7, according to an embodiment of the invention. With reference first to FIG. 8A, waveform 802 depicts an exemplary frequency spectral response at a first port, which in this embodiment is a 90-degree input port, of a quadrature hybrid coupler over a prescribed frequency range (e.g., about 1.9 GHz to about 2.3 GHz). Waveform 804 depicts an exemplary frequency spectral response at a second port, which in this embodiment is a zero-degree input port, of the quadrature hybrid coupler over the prescribed frequency range. As shown by waveform 802, two spectral components, m3 and m4, at frequencies of 2.030 GHz and 2.148 GHz, respectively, are generated at the 90-degree input port, with one spectral component being an image of the other. Each of the spectral components m3 and m4 is similar in amplitude, with component m3 having an amplitude of 6.654 dBm and component m4 having an amplitude of 6.123 dBm. Likewise, as shown by waveform 804, two spectral components, m5 and m6, at frequencies of 2.030 GHz and 2.148 GHz, respectively, are generated at the 0-degree input port, with one spectral component again being an image of the other. Each of the spectral components m5 and m6 is similar in amplitude, with component m5 having an amplitude of 6.688 dBm and component m6 having an amplitude of 6.298 dBm. Thus, as apparent from FIG. 8A, there is essentially no image rejection at the input ports of the quadrature hybrid coupler.

With reference now to FIG. 8B, waveform 812 depicts an exemplary frequency spectral response at a third port, which in this embodiment is an output port, of the quadrature hybrid coupler over the prescribed frequency range (e.g., about 1.9 GHz to about 2.3 GHz). Waveform 814 depicts an exemplary frequency spectral response at a fourth port, which in this embodiment is a reflection port, of the quadrature hybrid coupler over the prescribed frequency range. As shown by waveform 812, two spectral components, at frequencies of about 2.030 GHz and about 2.148 GHz, respectively, are generated at the output port, with one spectral component being an image of the other. However, unlike the spectral components present at the input ports, the image component of spectral component m1 is significantly reduced in amplitude, with component m1 having an amplitude of 9.683 dBm and its image component (not labeled) having an amplitude of about −32 dBm.

Likewise, as shown by waveform 814, two spectral components, at frequencies of about 2.030 GHz and about 2.148 GHz, respectively, are generated at the reflection port, with one spectral component being an image of the other. Spectral component m2, has an amplitude of 9.204 dBm and its image component (not labeled) has an amplitude of about −47 dBm. Moreover, spectral components m1 and m2 generated at the output and reflection ports, respectively, beneficially exhibit gain (e.g., greater than about 3 dB in this embodiment) compared to the input signals supplied to the quadrature hybrid coupler. Thus, as apparent from FIG. 8B, selective image rejection is achieved at the output and reflection ports of the quadrature hybrid coupler.

Assuming spectral component m1 is the signal of interest, the reflection port is preferably terminated, such as by connecting the reflection port to a termination circuit (e.g., a 50-ohm load), to thereby suppress the undesired image component without the use of filters in preceding circuitry connected with the quadrature hybrid coupler. Additional image rejection can be achieved through selective phase balancing of the input signals supplied to the quadrature hybrid coupler. This combing technique according to embodiments of the invention is highly efficient in that there is essentially no loss in power, but rather a gain in power is achieved.

Figure 9:
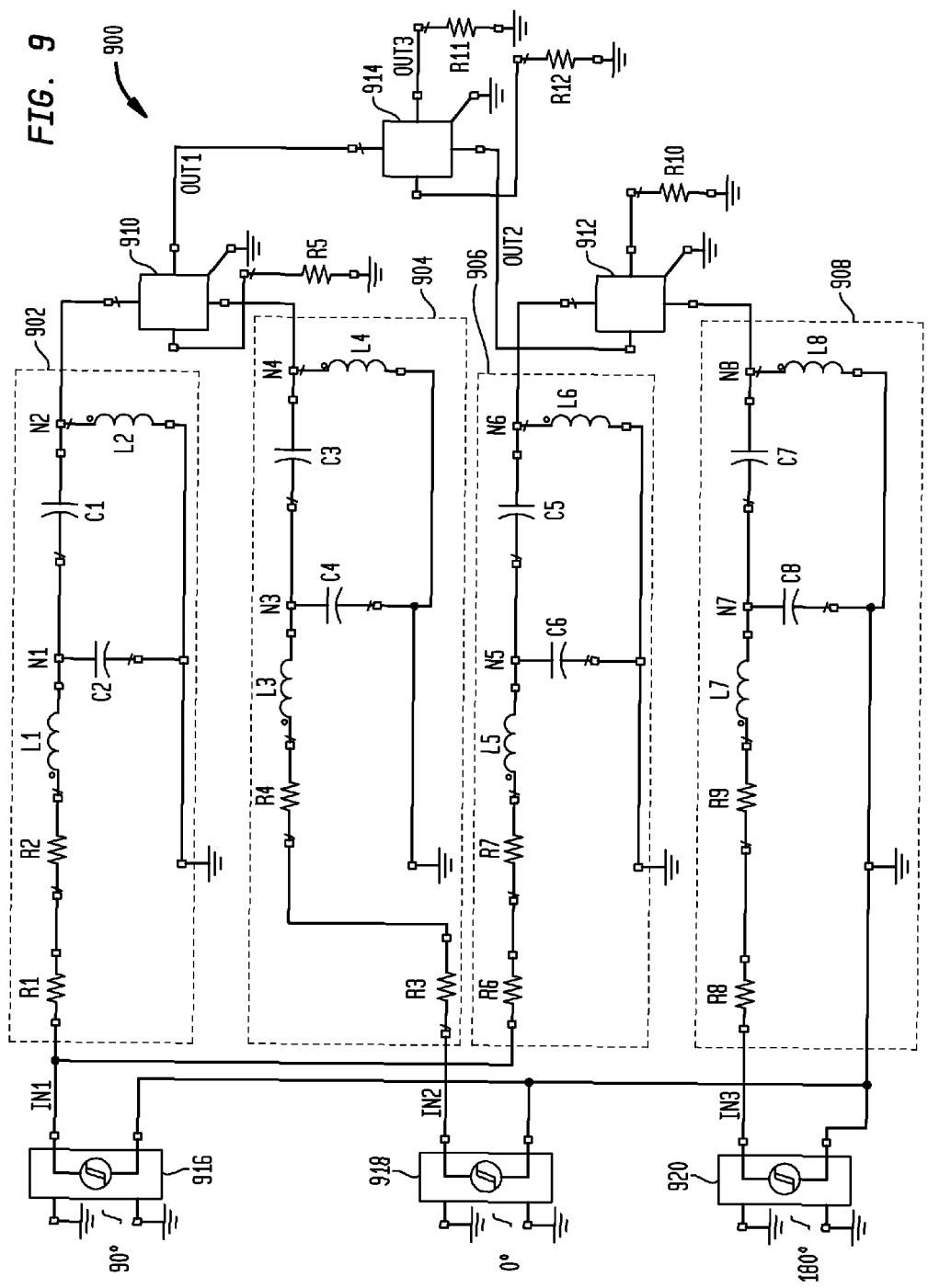
FIG. 9 is a schematic diagram depicting at least a portion of an exemplary RF combiner circuit, according to another embodiment of the invention.

The signal combining techniques in accordance with embodiments of the invention can be expanded for combing more than two RF bitstreams. By way of example only, FIG. 9 is a schematic diagram depicting at least a portion of an RF bitstream combiner circuit 900, according to another embodiment of the invention. Combiner circuit 900 comprises two layers of directional couplers, and thus expands the techniques of the combiner circuit 700 shown in FIG. 7, to efficiently combine three RF bitstreams. As previously stated, embodiments of the invention are not limited to any number of input bitstreams which may be combined.

Referring to FIG. 9, the combiner circuit 900 includes four low-Q impedance transformation networks, 902, 904, 906 and 908, and three RF directional couplers, 910, 912 and 914 (e.g., quadrature hybrid coupler, 3-dB hybrid, etc.). Each of the impedance transformation networks 902, 904, 906 and 908, in this embodiment, is a Norton equivalent representation of circuitry in a signal path between a given one of the input bitstreams and a corresponding directional coupler (e.g., transmission line, etc.). Although the impedance transformation networks 902, 904, 906 and 908 are implemented in this embodiment as broadband Norton equivalent networks, it is to be understood that other network types may also be employed. For example, in accordance with another embodiment, the impedance transformation networks 902, 904, 906 and 908 are implemented using narrowband Norton equivalent circuits to thereby achieve additional image rejection.

Each of the impedance transformation networks 902, 904, 906 and 908, in this embodiment, is formed in a manner consistent with the exemplary impedance transformation networks 702, 704 depicted in FIG. 7. Specifically, a first impedance transformation network 902 is adapted to receive a first input signal, IN1, which may be a 90-degree bitstream signal. Signal IN1, which may be generated by a first signal generator 916 (either incorporated within the combiner circuit 900 or external thereto), is supplied to a first terminal of a first resistor, R1, having a first resistance (e.g., about 7 ohms) associated therewith. A second terminal of resistor R1 is connected with a first terminal of a second resistor, R2, having a second resistance (e.g., about 7 ohms) associated therewith. Signal generator 916, as well as signal generators 918 and 920, represents a voltage source having an ideal source impedance of zero ohms. In reality, however, there will be some finite source impedance associated with each of these voltage sources 916, 918, 920. Resistors R1 and R2 in transformation network 902, and similarly resistors R3 and R4 in transformation network 904, resistors R6 and R7 in transformation network 906, and resistors R8 and R9 in transformation network 908, represent the respective finite impedances of the real sources 916, 918, 920. Although resistors R1 and R2, like resistors R3 and R4, resistors R6 and R7, and resistors R8 and R9, are shown as separate series resistance elements, it is to be understood that each of these pairs of resistors could have been combined into a single circuit element; the fact that there are two series resistors is essentially arbitrary, to the extent that the total finite impedances of the circuits are taken into account.

A second terminal of resistor R2 is connected with a first terminal of a first inductor, L1, having a first inductance (e.g., about 0.72 nanohenries (nH)) associated therewith. A second terminal of inductor L1 is connected with a first terminal of a first capacitor, C1, having a first capacitance (e.g., about 3.2 picofarads (pF)) associated therewith, at node N1. A second terminal of capacitor C1 is connected with a first terminal of a second inductor, L2, having a second inductance (e.g., about 3.07 nH) associated therewith, at node N2. A first terminal of a second capacitor, C2, having a second capacitance (e.g., about 5.5 pF) associated therewith, is connected with inductor L1 and capacitor C1 at node N1. Second terminals of capacitor C2 and inductor L2 are connected with a first voltage source, which is ground in this embodiment.

A second impedance transformation network 904 is adapted to receive a second input signal, IN2, which may be a zero-degree bitstream signal. Signal IN2, which may be generated by a second signal generator 918 (either incorporated within the combiner circuit 900 or external thereto), is ninety degrees out of phase relative to input signal N1. Signal IN2 is supplied to a first terminal of a third resistor, R3, having a third resistance (e.g., about 7 ohms) associated therewith. Again, as for resistor R1, the source impedance is arbitrarily chosen to be 7 ohms, although embodiments of the invention are not limited to any specific impedance. Rather, it is to be understood that embodiments of the invention demonstrate that practical systems can be created that can maintain quadrature relationships over a prescribed range of impedance ratios and over a prescribed range of frequency bands.

A second terminal of resistor R3 is connected with a first terminal of a fourth resistor, R4, having a fourth resistance (e.g., about 7 ohms) associated therewith. A second terminal of resistor R4 is connected with a first terminal of a third inductor, L3, having a third inductance (e.g., about 0.72 nanohenries (nH)) associated therewith. A second terminal of inductor L3 is connected with a first terminal of a third capacitor, C3, having a third capacitance (e.g., about 3.2 picofarads (pF)) associated therewith, at node N3. A second terminal of capacitor C3 is connected with a first terminal of a fourth inductor, L4, having a fourth inductance (e.g., about 3.07 nH) associated therewith, at node N4. A first terminal of a fourth capacitor, C4, having a fourth capacitance (e.g., about 5.5 pF) associated therewith, is connected with inductor L3 and capacitor C3 at node N3. Second terminals of capacitor C4 and inductor L4 are connected with the first voltage source.

A first port, which in this embodiment is a 90-degree input port, of a first directional coupler 910 is connected with the first impedance transformation network 902 at node N2. A second port, which in this embodiment is a zero-degree input port, of the directional coupler 910 is connected with the second impedance transformation network 904 at node N4. A first output signal, OUT1, is generated at a third port of the directional coupler 910, and a fourth port, which in this embodiment is a reflection port, of the directional coupler 910 is terminated using a fifth resistor, R5, having a fifth resistance (e.g., about 50 ohms) associated therewith, coupled between the fourth port of the directional coupler 910 and first voltage source (e.g., ground).

A third impedance transformation network 906 is adapted to receive the first input signal IN1. Signal IN1 is supplied to a first terminal of a sixth resistor, R6, having a sixth resistance (e.g., about 7 ohms) associated therewith. A second terminal of resistor R6 is connected with a first terminal of a seventh resistor, R7, having a seventh resistance (e.g., about 7 ohms) associated therewith. A second terminal of resistor R7 is connected with a first terminal of a fifth inductor, L5, having a fifth inductance (e.g., about 0.72 nanohenries (nH)) associated therewith. A second terminal of inductor L5 is connected with a first terminal of a fifth capacitor, C5, having a fifth capacitance (e.g., about 3.2 picofarads (pF)) associated therewith, at node N5. A second terminal of capacitor C5 is connected with a first terminal of a sixth inductor, L6, having a sixth inductance (e.g., about 3.07 nH) associated therewith, at node N6. A first terminal of a sixth capacitor, C6, having a sixth capacitance (e.g., about 5.5 pF) associated therewith, is connected with inductor L5 and capacitor C5 at node N5. Second terminals of capacitor C6 and inductor L6 are connected with the first voltage source.

Likewise, a fourth impedance transformation network 908 is adapted to receive a third input signal, IN3, which may be a 180-degree bitstream signal. Signal IN3, which may be generated by a third signal generator 920 (either incorporated within the combiner circuit 900 or external thereto), is ninety degrees out of phase relative to input signal N1 and 180 degrees out of phase relative to input signal IN2. With regard to the phase relationships of the input signals IN1, IN2 and IN3 relative to one another, it is to be understood that the invention is not limited to any specific phase, as long as a quadrature relationship is maintained between the ports. In other words, all of the combinations of phases can be described with four phase definitions (e.g., 0, 90, 180 and 270 degrees). Since phase pairs 0 and 180 are inversions of one another, as are phase pairs 90 and 270, all that is really required are 0 and 90 degree signals (i.e., the 180 and 270 degree signals can be generated by inverting the 0 and 90 degree signals, respectively).

Signal IN3 is supplied to a first terminal of an eighth resistor, R8, having an eighth resistance (e.g., about 7 ohms) associated therewith. A second terminal of resistor R8 is connected with a first terminal of a ninth resistor, R9, having a ninth resistance (e.g., about 7 ohms) associated therewith. A second terminal of resistor R9 is connected with a first terminal of a seventh inductor, L7, having a seventh inductance (e.g., about 0.72 nanohenries (nH)) associated therewith. A second terminal of inductor L7 is connected with a first terminal of a seventh capacitor, C7, having a seventh capacitance (e.g., about 3.2 picofarads (pF)) associated therewith, at node N7. A second terminal of capacitor C7 is connected with a first terminal of an eighth inductor, L8, having an eighth inductance (e.g., about 3.07 nH) associated therewith, at node N8. A first terminal of an eighth capacitor, C8, having an eighth capacitance (e.g., about 5.5 pF) associated therewith, is connected with inductor L7 and capacitor C7 at node N7. Second terminals of capacitor C8 and inductor L8 are connected with the first voltage source.

A first port, which in this embodiment is a 90-degree input port, of a second directional coupler 912 is connected with the third impedance transformation network 906 at node N6. A second port, which in this embodiment is a zero-degree input port, of the directional coupler 912 is connected with the fourth impedance transformation network 908 at node N8. A second output signal, OUT2, is generated at a third port of the directional coupler 912, which in this embodiment is a reflection port, and a fourth port, which in this embodiment is an output port, of the directional coupler 912 is terminated using a tenth resistor, R10, having a tenth resistance (e.g., about 50 ohms) associated therewith, coupled between the fourth port of the directional coupler 912 and first voltage source (e.g., ground).

The first output signal OUT1 generated at the output port of directional coupler 910 is fed to a first port, which in this embodiment is a 90-degree input port, of a third directional coupler 914. The second output signal OUT2 generated at the reflection port of directional coupler 912, is fed to a second port, which in this embodiment is a zero-degree input port, of the directional coupler 914. A third output signal, OUT3, is generated at a third port, which in this embodiment is an output port, of directional coupler 914, and a fourth port, which in this embodiment is a reflection port, of directional coupler 914 is terminated. The output signal OUT3 is an output of the combiner circuit 900. Resistor R11, which is connected between the output port of directional coupler 914 and the first voltage source, represents an output load of the combiner circuit 900 (e.g., about 50 ohms) for impedance matching purposes, and resistor R11, which is connected between the reflection port of the directional coupler 914 and the first voltage source, represents a termination impedance.

In the exemplary combiner circuit 900, four impedance transformation networks, 902, 904, 906 and 908, functioning as digital drivers, are used. The phases of the output signals generated by each of the drivers are arranged so that quadrature hybrid couplers 910, 912 and 914 can be used in tandem, as shown. Referring to FIG. 9, the phase of voltage source 916 leads the phase of voltage source 918. Additionally, by virtue of the truth table defined in FIG. 5A, a lower image of the generated signal is chosen to be summed while an upper image of the signal is chosen to be cancelled. In this illustrative embodiment, a "top" port of each of the couplers 910, 912, 914 should have a phase that leads the "bottom" port. For example, an output signal generated by the first impedance transformation network 902, which is coupled with the top port of hybrid coupler 910, has a phase which leads a phase of an output signal generated by the second impedance transformation network 904, which is coupled with the bottom port of the coupler 910. Having made the decision to sum the lower image component, a phase relationship of a second quadrature combiner includes a negative sign (−). Therefore, in order to continue rejecting the upper image component while also using a quadrature combiner, such as coupler 914, the phase of the "top" port of coupler 912 leads the phase of the "inverse" of the bottom port. This is why source 920 is designated as having a phase of 180 degrees. Multiple sections combined in this manner advantageously provide further image rejection, compared with a single-stage approach (e.g., combiner circuit 700), and redirect reflected energy away from the digital power driver.

It is to be appreciated that, while exemplary values for the resistors, inductors and capacitors in the exemplary combiner circuits 700 and 900 of FIGS. 7 and 9, respectively, are shown and/or described, embodiments of the invention are not limited to any specific values for the respective circuit elements. Furthermore, although the directional couplers 910, 912 and 914 are shown in the combiner circuit 900 of FIG. 9 as separate distributed elements, embodiments of the invention contemplate that the couplers can be formed as a fully integrated lumped element, as will become apparent to those skilled in the art.

Figure 10:
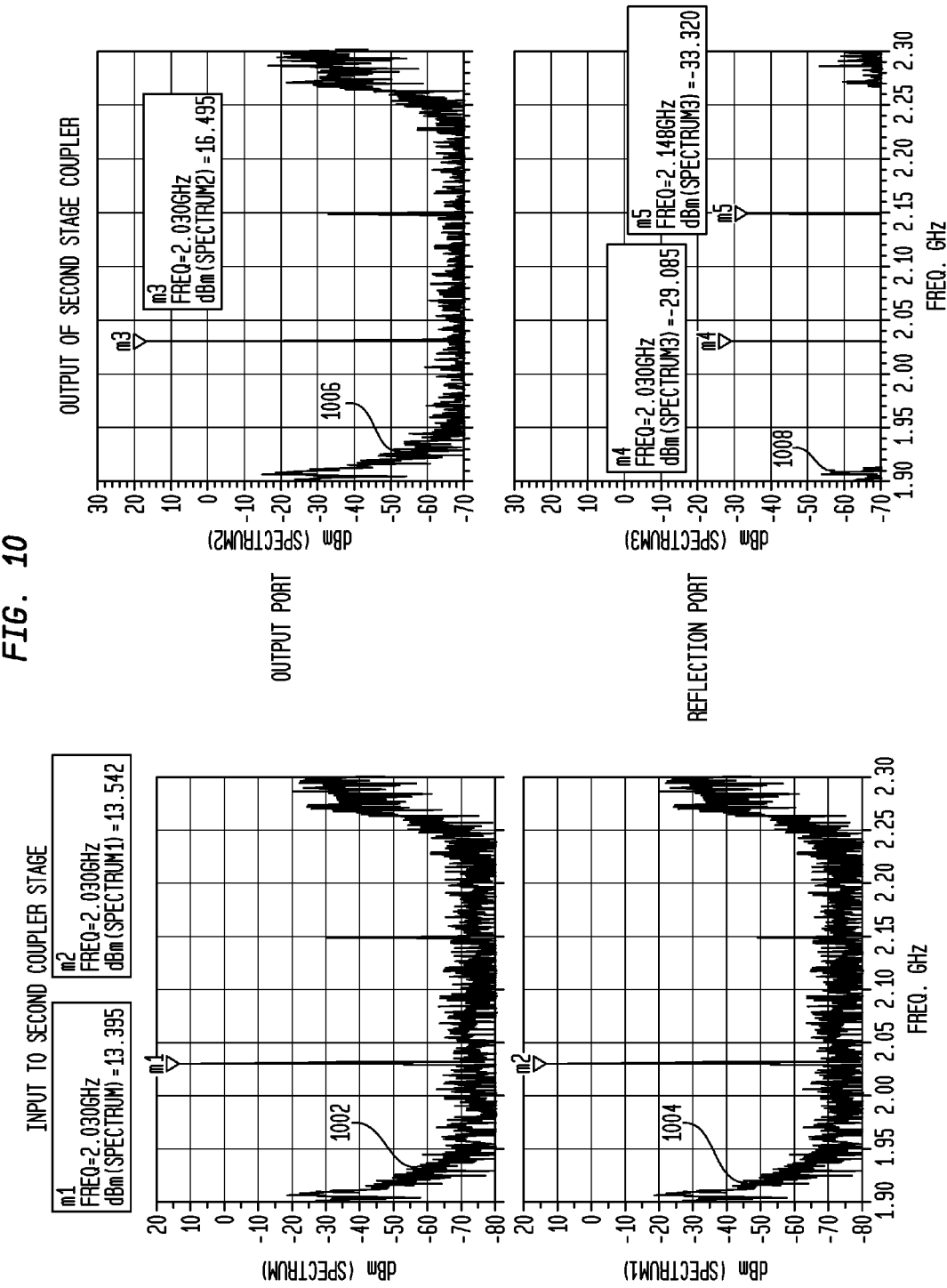
FIG. 10 conceptually depicts selective cancellation of image components based on selected input digital bitstreams using the illustrative combiner circuit shown in FIG. 9, according to an embodiment of the invention.

FIG. 10 conceptually depicts selective cancellation of image components based on selected input digital bitstreams using the illustrative combiner circuit 900 shown in FIG. 9, according to an embodiment of the invention. With reference to FIG. 10, waveform 1002 depicts an exemplary frequency spectral response of output signal OUT1, generated at the output port of directional coupler 910, over a prescribed frequency range (e.g., about 1.9 GHz to about 2.3 GHz). Waveform 1004 depicts an exemplary frequency spectral response of output signal OUT2 generated at the reflection port of directional coupler 912 over the prescribed frequency range. Waveform 1002 depicts a spectral component m1 of signal OUT1 at a frequency of 2.030 GHz and its corresponding image component at a frequency of 2.148 GHz; component m1 is the output signal OUT1 at a frequency of interest. Spectral component m1 has an amplitude of 13.395 dBm and its image component has an amplitude of about −30 dBm, thus representing an image suppression ratio of greater than about 43 dB. Likewise, waveform 1004 depicts a spectral component m2 at a frequency of 2.030 GHz and its image component at a frequency of 2.148 GHz; component m1 is the output signal OUT2 at the frequency of interest. Spectral component m2 has an amplitude of 13.542 dBm and its image component has an amplitude of about −50 dBm, thus representing an image suppression ratio of greater than about 63 dB.

Waveform 1006 depicts an exemplary frequency spectral response of the output signal OUT3, generated at the output port of directional coupler 914, over the prescribed frequency range (e.g., about 1.9 GHz to about 2.3 GHz). Waveform 1008 depicts an exemplary frequency spectral response of the signal generated at the reflection port of the directional coupler 914 over the prescribed frequency range. As apparent from FIG. 10, waveform 1006 depicts a spectral component m3 of signal OUT3 at a frequency of 2.030 GHz and its corresponding image component at a frequency of 2.148 GHz3. Spectral component m3 has an amplitude of 16.495 dBm and its image component has an amplitude of about −33 dBm, thus representing an image suppression ratio of greater than about 49 dB. Waveform 1008 depicts spectral components m4 and m5 at frequencies of 2.030 GHz and 2.148 GHz, respectively, with one component being an image of the other. Both of these spectral components are significantly attenuated, with component m4 having an amplitude of −29.085 dBm and component m5 having an amplitude of −33.320 dBm. Thus, while the combiner circuit 900 demonstrates significant image rejection without the use of any filtering, through selective phase arrangement, it also provides a gain of greater than about 9.8 dBm.

More generally, each bitstream generator driver that is combined using methods according to embodiments of the invention will experience a doubling of the input power as seen at the output. Thus, combining four drivers will produce four times the output power, or +6 dB of gain. FIGS. 8 and 10 were produced from different exemplary simulations, however the quadrature input signal relationship is maintained for both illustrative scenarios.

At least a portion of the techniques of the present invention may be implemented in an integrated circuit. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Any of the exemplary circuits illustrated in the accompanying figures, or portions thereof, may be part of an integrated circuit. Integrated circuits so manufactured are considered part of this invention.

An integrated circuit in accordance with the present invention can be employed in essentially any application and/or electronic system involving RF signal processing. Lower frequency applications (e.g., less than RF frequencies) could similarly be accommodated using a lumped element equivalent of the quadrature coupler, as will become apparent to those skilled in the art given the teachings herein. Suitable systems for implementing techniques of the invention may include, but are not limited, to wireless communication systems, signal processors, power amplifiers (e.g., switching power amplifiers (SWPAs), single side-band amplifiers), transmitters, receivers, signal generators, communication networks, etc. Systems incorporating such integrated circuits are considered part of this invention. Given the teachings of the invention provided herein, one of ordinary skill in the art will be able to contemplate other implementations and applications of the embodiments of the invention.

The illustrations of embodiments of the invention described herein are intended to provide a general understanding of the various embodiments, and they are not intended to serve as a complete description of all the elements and features of apparatus and systems that might make use of the circuits and techniques described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. §1.72 (b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A circuit for combining a plurality of digital bitstreams, the circuit comprising:
    first and second bitstream generators, the first bitstream generator being operative to receive a first analog signal and to generate a first digital bitstream as a function of the first analog signal, the second bitstream generator being operative to receive a second analog signal and to generate a second digital bitstream as a function of the second analog signal, the first and second bitstream generators being configured to maintain a substantially ninety-degree phase difference between the first and second digital bitstreams; and
    a directional coupler configured to receive, at a first port, a first input signal comprising the first digital bitstream, and configured to receive, at a second port, a second input signal comprising the second digital bitstream, the directional coupler maintaining a substantially ninety-degree phase difference between the first and second input signals, the directional coupler including a third port that is terminated, the directional coupler generating, at a fourth port, a first output signal which is indicative of a combination of the first and second input signals in such a manner that an image component associated with at least one of the first and second input signals is suppressed in power at the fourth port without a need for filtering to attenuate the image component.

2. The circuit of claim 1, further comprising an analog Hilbert bandpass filter adapted to receive an analog real-valued baseband input signal and operative to generate the first and second analog signals supplied to the first and second bitstream generators, respectively, each of the first and second analog signals being a complex-valued component of the real-valued baseband input signal and having a quadrature phase relationship relative to one another.

3. The circuit of claim 1, further comprising:
    a third bitstream generator, the third bitstream generator being operative to receive a third analog signal and to generate a third digital bitstream as a function of the third analog signal;
    a second directional coupler configured to receive, at a first port, a third input signal comprising the first digital bitstream, and configured to receive, at a second port, a fourth input signal comprising the third digital bitstream, the second directional coupler maintaining a substantially ninety-degree phase difference between the third and fourth input signals, the second directional coupler including a third port that is terminated, the second directional coupler generating, at a fourth port, a second output signal which is indicative of a combination of the third and fourth input signals in such a manner that an image component associated with at least one of the third and fourth input signals is suppressed in power at the fourth port without a need for filtering to attenuate the image component; and
    a third directional coupler comprising a first port configured to receive the first output signal, a second port configured to receive the second output signal, a third port that is terminated, and a fourth port configured to generate a third output signal which is indicative of a combination of the first and second output signals in such a manner that an image component associated with at least one of the first and second output signals is suppressed in power at the fourth port of the third directional coupler without a need for filtering to attenuate the image component.

4. The circuit of claim 3, further comprising third and fourth impedance transformation networks, the third impedance transformation network being operative to receive the first digital bitstream and to generate the third input signal as a function of the first digital bitstream, the fourth impedance transformation network being operative to receive the third digital bitstream and to generate the fourth input signal as a function of the third digital bitstream, the third and fourth impedance transformation networks being configured to maintain a substantially ninety-degree phase relationship between the third and fourth input signals.

5. The circuit of claim 4, wherein each of the third and fourth impedance transformation networks is configured having an arbitrary input-versus-output phase relationship, an input-versus-output phase relationship of the third impedance transformation network substantially tracking an input-versus-output phase relationship of the fourth impedance transformation network.

6. The circuit of claim 4, wherein the third output signal exhibits a quadrupling of power compared to either of the first, second, and third digital bitstreams.

7. The circuit of claim 4, wherein each of the first, second, third and fourth impedance transformation networks comprises a broadband impedance transforming network.

8. The circuit of claim 4, wherein each of the first, second, third and fourth impedance transformation networks comprises a narrowband impedance transforming network.

9. The circuit of claim 1, wherein the at least one directional coupler comprises a quadrature hybrid coupler.

10. The circuit of claim 1, wherein the first output signal exhibits an increase of power compared to either of the first and second digital bitstreams.

11. The circuit of claim 1, wherein a phase difference between the first and second input signals to the directional coupler is maintained within a prescribed range of ninety degrees.

12. The circuit of claim 1, wherein at least a portion of the circuit is fabricated in at least one integrated circuit.

13. A circuit for combining a plurality of digital bitstreams, the circuit comprising:
first and second bitstream generators, the first bitstream generator being operative to receive a first analog signal and to generate a first digital bitstream as a function of the first analog signal, the second bitstream generator being operative to receive a second analog signal and to generate a second digital bitstream as a function of the second analog signal, the first and second bitstream generators being configured to maintain a substantially ninety-degree phase difference between the first and second digital bitstreams;
a directional coupler configured to receive, at a first port, a first input signal comprising the first digital bitstream, and configured to receive, at a second port, a second input signal comprising the second digital bitstream, the directional coupler maintaining a substantially ninety-degree phase difference between the first and second input signals, the directional coupler including a third port that is terminated, the directional coupler generating, at a fourth port, a first output signal which is indicative of a combination of the first and second input signals in such a manner that an image component associated with at least one of the first and second input signals is suppressed in power at the fourth port without a need for filtering to attenuate the image component;
a first impedance transformation network operative to receive the first digital bitstream and to generate the first input signal as a function of the first digital bitstream; and
a second impedance transformation network operative to receive the second digital bitstream and to generate the second input signal as a function of the second digital bitstream, the first and second impedance transformation networks being configured to maintain a substantially ninety-degree phase difference between the first and second input signals.

14. The circuit of claim 13, wherein each of the first and second impedance transformation networks is configured to have an arbitrary input-versus-output phase relationship, an input-versus-output phase relationship of the first impedance transformation network substantially tracking an input-versus-output phase relationship of the second impedance transformation network.

15. The circuit of claim 13, wherein at least a given one of the first and second impedance transformation networks comprises:
a resistor having a first terminal adapted to receive a given one of the first and second digital bitstreams;
first and second inductors, the first inductor having a first terminal connected with a second terminal of the resistor, the second inductor having a first terminal adapted for connection with a first voltage source; and
first and second capacitors, the first capacitor having a first terminal connected with a second terminal of the first inductor and having a second terminal connected with a second terminal of the second inductor, the second capacitor having a first terminal connected with the second terminal of the first inductor and having a second terminal adapted for connection with the first voltage source;
wherein a given one of the first and second input signals is generated by the given one of the first and second impedance transformation networks, respectively, at the second terminal of the second capacitor.

16. The circuit of claim 13, wherein each of the first and second impedance transformation networks comprises a broadband impedance transforming network.

17. The circuit of claim 13, wherein each of the first and second impedance transformation networks comprises a narrowband impedance transforming network.

18. An electronic system, comprising:
at least one integrated circuit, the at least one integrated circuit including at least one circuit for combining a plurality of digital bitstreams, the at least one integrated circuit comprising:
first and second bitstream generators, the first bitstream generator being operative to receive a first analog signal and to generate a first digital bitstream as a function of the first analog signal, the second bitstream generator being operative to receive a second analog signal and to generate a second digital bitstream as a function of the second analog signal, the first and second bitstream generators being configured to maintain a substantially ninety-degree phase difference between the first and second digital bitstreams; and
a directional coupler configured to receive, at a first port, a first input signal comprising the first digital bitstream, and configured to receive, at a second port, a second input signal comprising the second digital bitstream, the directional coupler maintaining a substantially ninety-degree phase difference between the first and second input signals, the directional coupler including a third port that is terminated, the directional coupler generating, at a fourth port, a first output signal which is indicative of a combination of the first and second input signals in such a manner that an image component associated with at least one of the first and second input signals is suppressed in power at the fourth port without a need for filtering to attenuate the image component.

19. The system of claim 18, wherein the at least one integrated circuit further comprises:
a first impedance transformation network operative to receive the first digital bitstream and to generate the first input signal as a function of the first digital bitstream;
a second impedance transformation network operative to receive the second digital bitstream and to generate the second input signal as a function of the second digital bitstream, the first and second impedance transformation networks being configured to maintain a substantially ninety-degree phase difference between the first and second input signals.

20. The system of claim 18, wherein the at least one integrated circuit further comprises an analog Hilbert bandpass filter adapted to receive an analog real-valued baseband input signal and operative to generate the first and second analog signals supplied to the first and second bitstream generators, respectively, each of the first and second analog signals being a complex-valued component of the real-valued baseband input signal and having a quadrature phase relationship relative to one another.

21. The system of claim 18, wherein the at least one integrated circuit further comprises:
a third bitstream generator, the third bitstream generator being operative to receive a third analog signal and to generate a third digital bitstream as a function of the third analog signal;

a second directional coupler configured to receive, at a first port, a third input signal comprising the first digital bitstream, and configured to receive, at a second port, a fourth input signal comprising the third digital bitstream, the second directional coupler maintaining a substantially ninety-degree phase difference between the third and fourth input signals, the second directional coupler including a third port that is terminated, the second directional coupler generating, at a fourth port, a second output signal which is indicative of a combination of the third and fourth input signals in such a manner that an image component associated with at least one of the third and fourth input signals is suppressed in power at the fourth port without a need for filtering to attenuate the image component; and a third directional coupler comprising a first port configured to receive the first output signal, a second port configured to receive the second output signal, a third port that is terminated, and a fourth port configured to generate a third output signal which is indicative of a combination of the first and second output signals in such a manner that an image component associated with at least one of the first and second output signals is suppressed in power at the fourth port of the third directional coupler without a need for filtering to attenuate the image component.

\* \* \* \* \*